United States Patent
Sorger

[15] 3,693,078
[45] Sept. 19, 1972

[54] SWEPT FREQUENCY VSWR MEASUREMENT WITH SLOTTED LINE

[72] Inventor: Gunther U. Sorger, Bethesda, Md.
[73] Assignee: Weinschel Engineering Co., Inc., Gaithersburg, Md.
[22] Filed: Feb. 15, 1967
[21] Appl. No.: 616,283

[52] U.S. Cl. ................................. 324/58 B, 324/95
[51] Int. Cl. ............................................. G01r 27/04
[58] Field of Search ..................... 324/58, 58.5 B, 95

[56] References Cited

UNITED STATES PATENTS

| | | | |
|---|---|---|---|
| 2,680,837 | 6/1954 | Sensiper | 324/58 B |
| 2,876,416 | 3/1959 | Vinding | 324/58 B |
| 2,983,886 | 5/1961 | Alford et al. | 324/58 B |
| 3,162,807 | 12/1964 | Alford | 324/58 B |
| 2,762,972 | 9/1956 | Henning | 324/58 |

OTHER PUBLICATIONS

Hewlett – Packard Journal, Vol. 16, No. 6; Feb. 1965, pp. 1–8.

Sorger and Weinschel Swept–Frequency High Resolution VSWR Measuring System, in Weinschel Engineerig Co. Internal Report 723– 3/66. 10 pages March, 1966

De Ronde, X–Band Reflectometer, In IEEE Trans on Microwave Theory and Techniques, Vol. 13, pp. 435–440, July 1965.

Primary Examiner—Stanley T. Krawczewicz
Attorney—Max L. Libman

[57] ABSTRACT

A system is disclosed for measuring VSWR of microwave components through a continuous range of frequencies in a very short time (approximately 1 minute), with a very high accuracy, the result being displayable on a memory oscilloscope as a broad band of signals, with the difference between the top and bottom of the band, at any frequency, giving an indication of the VSWR. A slotted line probe is moved one-half wavelength of the lowest frequency being measured, and the output of a reference probe is used to provide a feedback signal to balance out the rising frequency characteristics which would otherwise exist.

9 Claims, 5 Drawing Figures

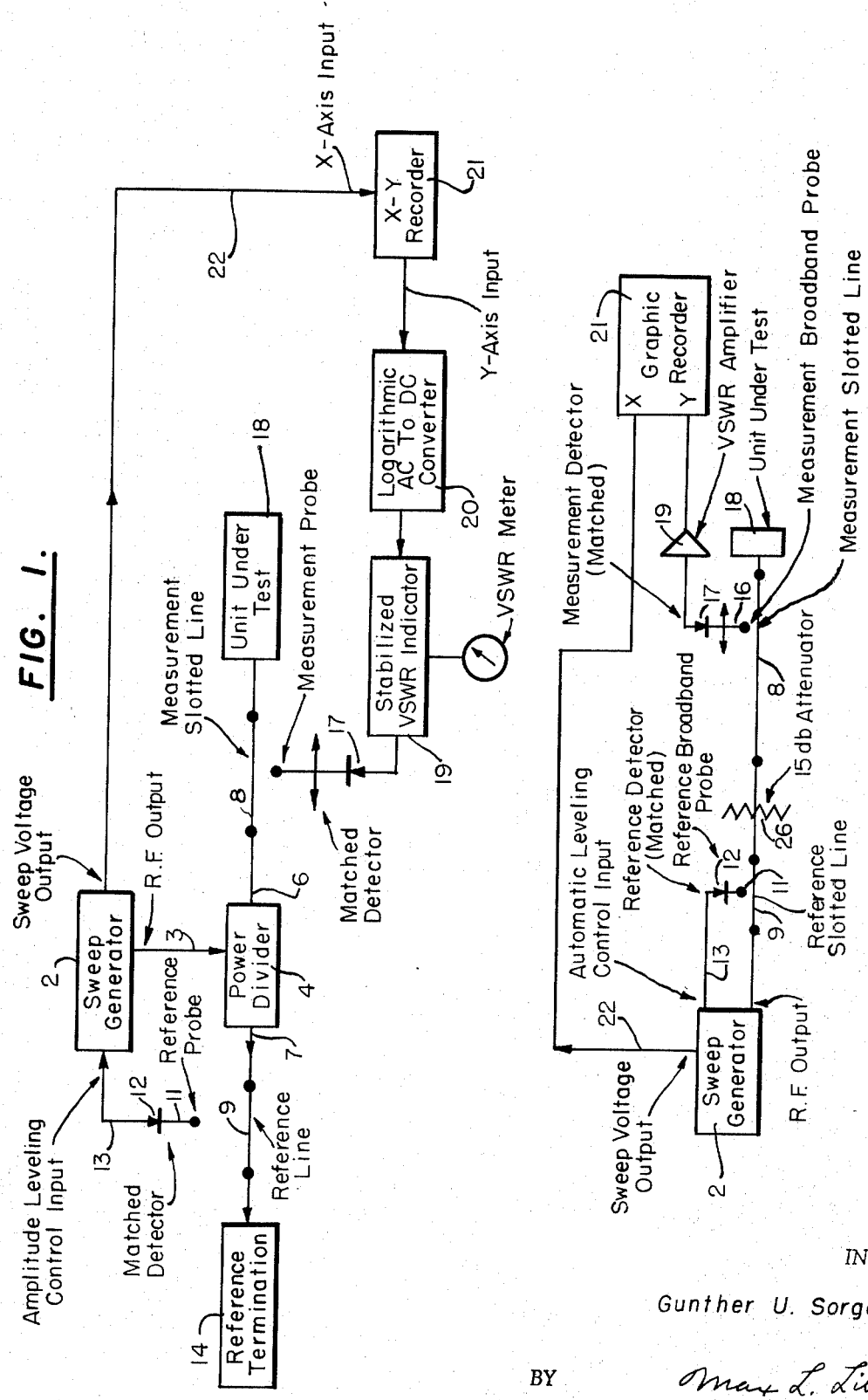

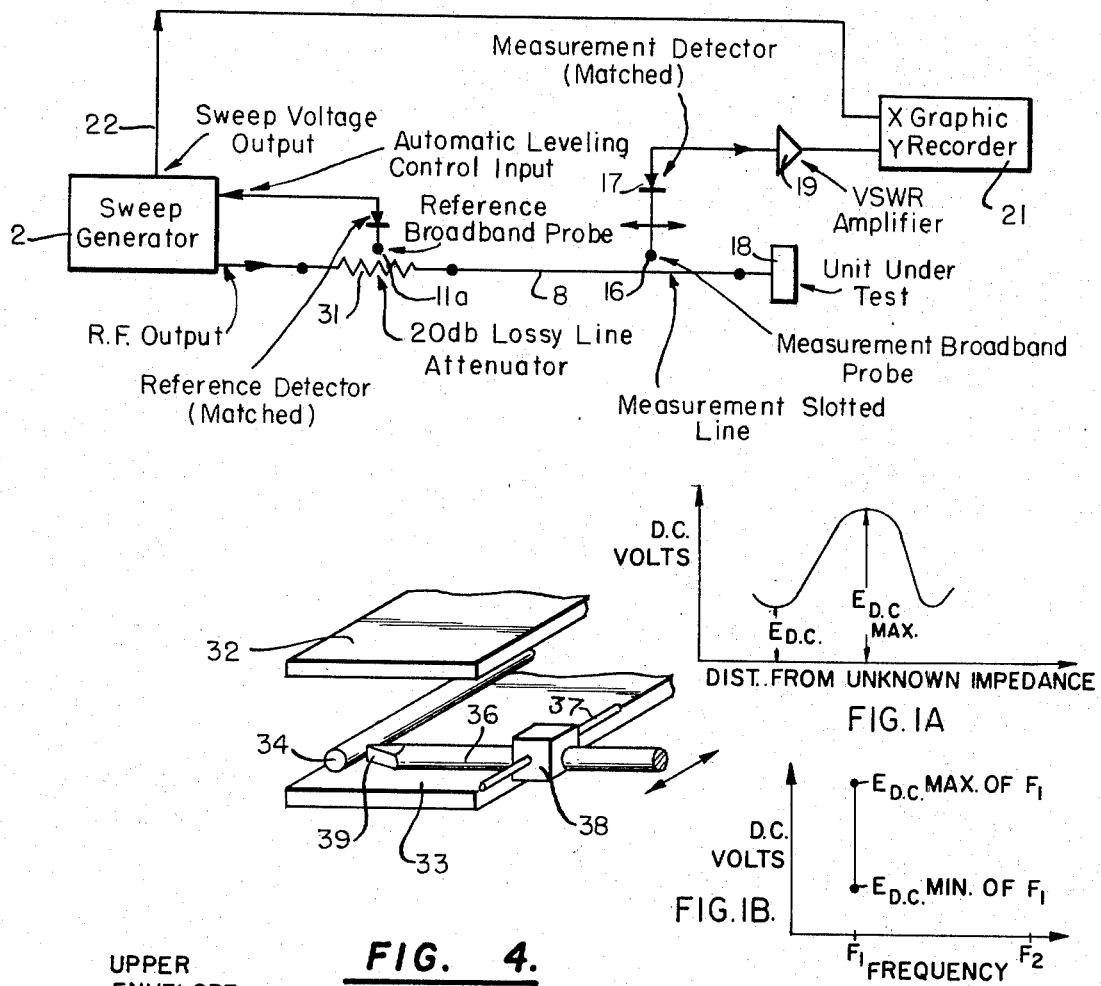
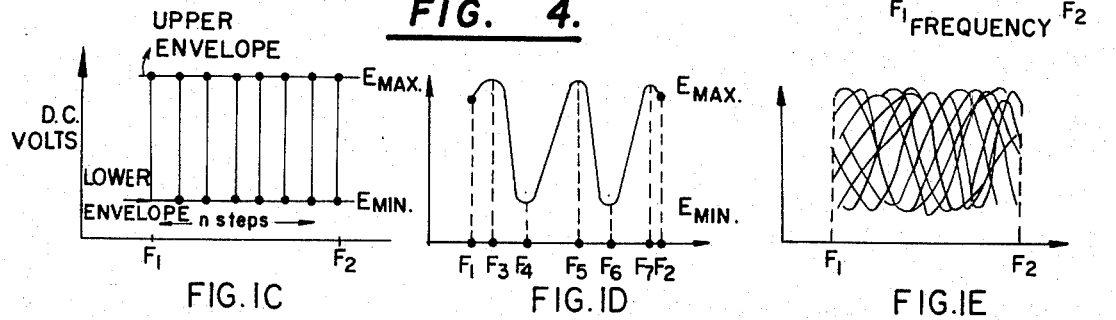
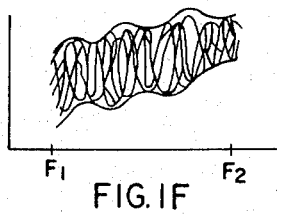
INVENTOR
Gunther U. Sorger
BY Max L. Libman
ATTORNEY

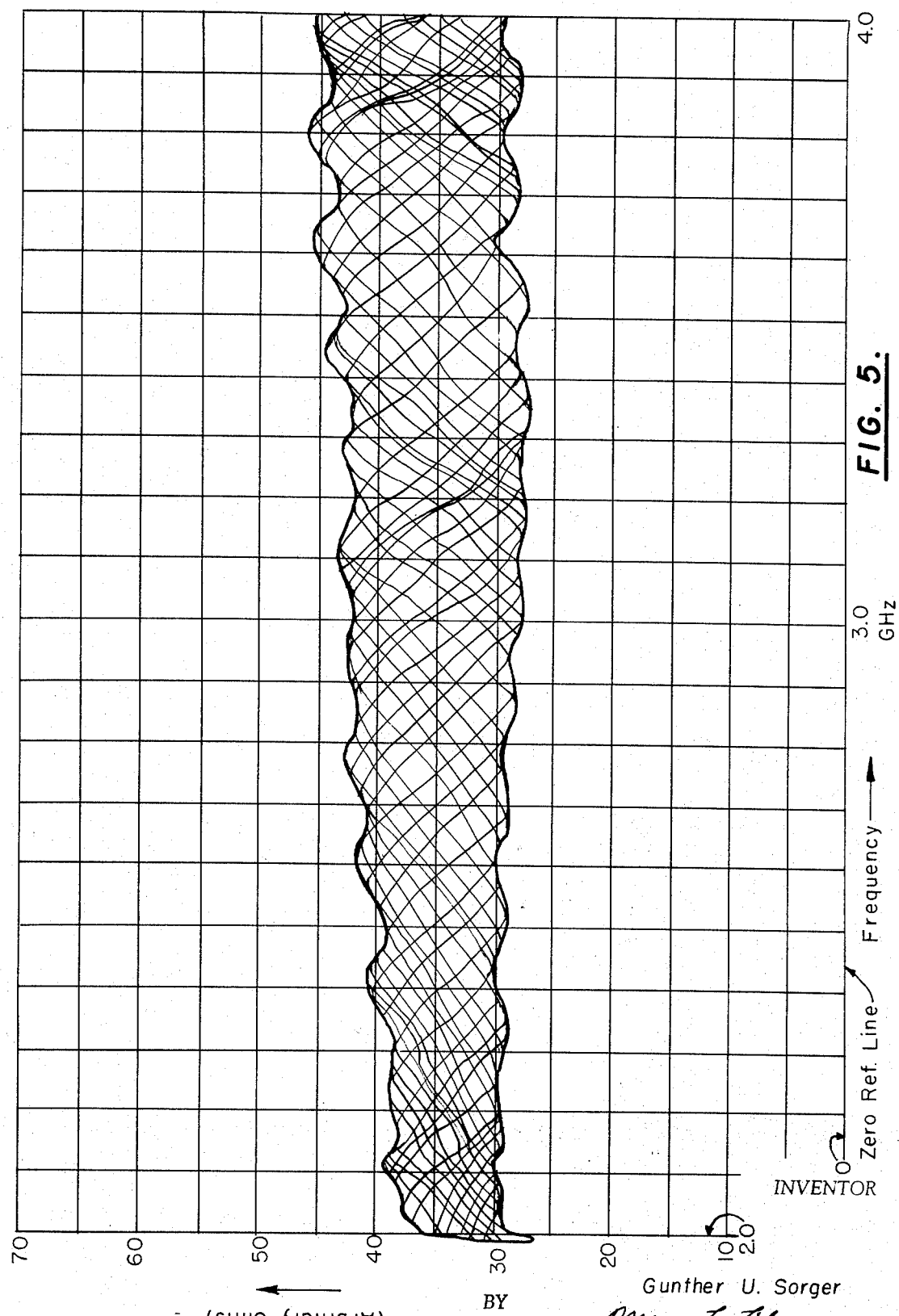

SWEPT FREQUENCY VSWR MEASUREMENT WITH SLOTTED LINE

This invention relates to a system for measuring the VSWR of a microwave component through a continuous range of frequencies, in a very short time and with an accuracy normally associated only with precision slotted line techniques. It applies to both coaxial and wave-guide components.

Accurate measurement of VSWR requires either a very good slotted line or a highly directive directional coupler, which is available usually only over a range of about an octave and only, at present, for lower frequencies. Highly accurate coaxial slotted lines are available in almost any frequency range in which coaxial transmission lines and good connectors are available, and the wavelength does not become excessively long (100 MHz to 18 GHz). Waveguide slotted sections are available in any frequency range in which waveguide components exist. Slotted lines usually cover a range of about 10 to 1 in frequency. One can evaluate the accuracy of the slotted line by making measurements of the residual VSWR at fixed frequencies, but this technique is relatively slow if information over a wide frequency range is desired.

If an unknown component is to be evaluated (VSWR vs. frequency) it takes a long time to make point-by-point measurements at fixed frequencies, especially if the component changes VSWR rapidly with frequency, as is often the case in multi-element units such as long attenuators, directional couplers, power dividers, etc.

The system of the present invention uses an ordinary slotted line, such as is used for high frequency work, in a system which enables a swept frequency evaluation to be made over a range of 5 to 10 octaves. Only about one minute is required to obtain the VSWR continuously with respect to frequency over a range limited at present only by the frequency range of available sweep generators. It would be possible to make such a VSWR measurement over a 10:1 frequency range if a suitable sweep generator is available, as is the case for low frequencies, e.g., 100–500 mc.

Normally the voltage sample of the slotted line is obtained by putting a small probe in the slot, picking up a certain amount of the RF voltage and bringing it out to a connector or often directly into a crystal detector which is mounted on the end of the probe and moves with it. The probe normally represents a very reactive impedance, and in order to obtain maximum signal power out of the probe, the crystal is usually tuned to the probe for a particular frequency. However, this restricts the efficient operation of the device to the narrow frequency range to which it is tuned. For swept frequency use, since a wide frequency range must be covered, an untuned probe is used, which is matched to the transmission line on the probe output, and then a matched crystal detector is used at the output of the probe. In this way, while the efficiency of the probe might be reduced as compared to a tuned probe, it is possible to use the probe over a broad band of frequencies. A particular novel type of probe construction can be used, which will be described in more detail below.

In accordance with the present invention, the output of a sweep generator is supplied to a reference arm and to the measurement arm containing a slotted line having a broadband untuned probe. Output from the detector of the slotted line is fed through a "standing wave" amplifier to an X-Y recorder. Output from the reference arm controls the levelling circuit of the sweep oscillator to maintain a constant detected voltage level at the reference probe over the swept frequency range. Measurements of the unit under test are made by plotting the output vs. frequency from the probe on the measurement slotted line for a number of probe positions, or continuously, as the probe is moved over a distance at least equal to one-half wavelength at the lowest frequency.

All recordings will lie within a band. The upper edge of the band indicates the maximum of voltage vs. frequency while the lower edge indicates the minimum of voltage vs. frequency. If the crystal detector on the measurement probe is operated in its square law range, the ratio of the distance between the upper edge and the zero signal reference line, to the distance between the lower edge and the zero reference line is equal to ($e_{rf}$ max$^2$/$e_{rf}$ min). Since VSWR is defined as $e_{rf}$ max/$e_{rf}$ min, the above-described ratio is equal to the square of the VSWR of the device under test at the particular frequency.

A memory oscilloscope can also be used as a recording device where the probe output is fed into the vertical channel and a signal proportional to frequency into the horizontal channel. The advantage is that the swept VSWR data will be obtained almost simultaneously.

The specific nature of the invention as well as other objects and advantages thereof will clearly appear from a description of a preferred embodiment as shown in the accompanying drawings, in which:

FIG. 1 is a block diagram of a swept frequency VSWR measurement set-up, in which a parallel reference line is employed:

FIGS. 1A–1F inclusive are a series of graphs used in explaining the principle of operation of the device;

FIG. 2 is a similar block diagram with a tandem arrangement of the reference slotted line;

FIG. 3 is a similar block diagram showing a different modification using a lossy line attenuator;

FIG. 4 is a schematic perspective sectional view of a precision slotted line using a broadband probe for swept-frequency measurements; and FIG. 5 is a section of a typical record produced in accordance with the invention.

A slotted line is usually used at a fixed frequency for VSWR measurement. One moves its carriage about one-fifth wavelength. Commonly, a voltage measuring probe is used. The probe in the carriage then travels through a place where the voltage of the incident and the reflected waves are in phase, producing a voltage maximum and a place where they are 180° out of phase, producing a voltage minimum. These two points are exactly a quarter wavelength apart.

The simplest RF voltage detector, and the one most often used in the probe, is a semiconductor diode, operated at a low enough level so that it remains in the square-law region where the rectified output-voltage varies with the square of the RF input voltage. This occurs typically for output voltages below 2 millivolts and RF levels into the prove of less than −30 dBm or 1 microwatt.

If the RF is unmodulated or CW, the rectified output is D-C; since stable, drift-free D-C amplifiers of such sensitivity are more expensive than audio amplifiers, one modulates most commonly the RF signal with 1,000 Hz. In order that the instability of the percentage of modulation becomes unimportant, one uses usually 100 percent square wave modulation. However, the tuned amplifier responds only to the 1,000 Hz fundamental. The output of the 1,000 Hz amplifier is usually rectified by a diode operating in its linear region. This D-C voltage is then proportional to the square of the RF voltage. The VSWR is then:

$$VSWR = \frac{E_{max} RF}{E_{min} RF} = \sqrt{\frac{E_{max} \text{ D.-C.}}{E_{min} \text{ D.-C.}}}$$

If the readout operates in decibels, we have $$20 \log_{10} \left(\frac{E_{max} \text{ D.-C.}}{E_{min} \text{ D.-C.}}\right)^{1/2} [DB] = 20 \log_{10} VSWR[DB]$$

$$\frac{1}{2} \log_{10} \left(\frac{E_{max} \text{ D.-C.}}{E_{min} \text{ D.-C.}}\right) [DB] = \log_{10} VSWR[DB]$$

This means one-half the ratio of D-C dB equals the VSWR dB. A variation in the absolute RF level is immaterial as long as it does not occur while the ratio is measured.

A typical recording of rectified 1,000 Hz probe output vs. travel is shown in FIG. 1A. If one plots the D-C voltage excursion due to probe travel vs. frequency for frequency $F_1$ one sees in Fig. 1B only the projection of the curve in FIG. 1A on the ordinate, the graphical representation being in this case a straight vertical line of which the top and bottom points represent the two values of interest.

With a constant RB power from $F_1$ to $F_2$ and constant probe coupling vs. frequency, and if the rectification efficiency of the Rf diode in the probe vs. frequency is assumed to be constant, a load of constant VSWR from $F_1$ to $F_2$ (e.g., a resistive mismatch standard) would produce at each frequency between $F_1$ and $F_2$ an identical vertical line as shown in FIG. 1C as long as the probe travel at each frequency is long enough to cover a maximum and a minimum. If the frequency is varied in small steps and at each fixed frequency, the probe travel passes through a maximum and a minimum, the graph of FIG. 1C would result, being a series of vertical lines of which, again, the top and bottom points are of interest.

One could accomplish this by increasing the frequency in ($n$) small steps and have e.g., a mechanism move the probe forward for $F_1 + \Delta F$ and back for $F_1 + 2 \Delta F$, etc. The ratio of the upper and lower envelope in FIG. 1C gives the VSWR information for each frequency between $F_1$ and $F_2$.

A converse method for constructing this envelope between $F_1$ and $F_2$ would be to use an RF signal which is swept or frequency modulated between $F_1$ and $F_2$, while the abscissa of the D-C display mechanism (recorder or memory oscilloscope) is driven by a voltage proportional to the frequency variation and the ordinate is proportional to the D-C voltage in FIG. 1C; the probe is left in a fixed position, while the frequency varies from $F_1$ to $F_2$.

If at a frequency $F_3$, which is between $F_1$ and $F_2$, the probe position is left at the position of the VSWR maximum and if the frequency is swept from $F_1$ to $F_2$, through $F_3$, the trace of probe output vs. frequency will go through this maximum point, as shown in FIG. 1D.

How many more maxima will be recorded depends upon the electrical distance between the probe and load. If the next maximum occurs at $F_5$, the next at $F_7$, while the next minima occur at $F_4$ and $F_6$, the relation is such that subsequent maxima are spaced a fixed frequency difference $\Delta F$ apart. The first minimum at $F_4$ following $F_3$ is $$F_4 - F_3 = \tfrac{1}{2} F_3/n = \tfrac{1}{2} \Delta F \text{ away, etc.}$$

If the probe position is moved in small steps so that at $F_1$ a total displacement of $\lambda_1/2$ is covered, then the resulting traces produce all possible maxima and minima between $F_1$ and $F_2$. Thus the curve under these assumptions is as shown in FIG. 1E, which is a family of curves; the envelopes of this family of curves are then identical to the envelopes in FIG. 1C; their vertical distance apart at each frequency is proportional to VSWR. If the ordinate is on a logarithmic scale, the distance is directly proportional to VSWR. In practice, due to the finite width of the curve on an oscilloscope, and to the fact that actually an infinite amount of time would be required to pass through all possible positions, the result is to some extent an approximation, but the upper and lower envelopes, which define the only points of interest, are still very accurately determined, so that for all practical purposes one may say that the result is the same as if the curves were actually sweeping through every possible point during the measurement.

The above analysis is for a theoretical load having a constant VSWR; actual loads usually have a VSWR which is not constant between $F_1$ and $F_2$; so that the top and bottom envelopes in practice are not straight lines but are irregularly varying lines. Furthermore, the general envelope trace tends to be tilted upward, because even if the power output of the sweeper is constant between $F_1$ and $F_2$ due to internal levelling, the probe coupling increases usually 6 dB per octave. The resulting trace therefore tends to appear in practice more like that shown in 1F. However, as will be explained below, this still can be compensated for so that the resulting trace is generally horizontal.

Referring to FIG. 1, power from sweep oscillator 2 is sent on line 3 to power divider 4, where it is divided into two channels, namely, the measurement channel 6 and a reference channel 7, which are connected respectively to the measurement slotted line 8 and to the reference slotted line 9. As previously explained it is desirable for the present test to use a broadband probe, and as the frequency is increased, the output of a square law detector connected to the probe would have a rising characteristic with increasing frequency. With a matched load having a reflection coefficient of zero, this output would be a line sloping up with increasing frequency. With a load having a reflection coefficient greater than zero, periodic fluctuations would be superimposed on this straight line, and since it is these periodic fluctuations which are of interest in the present case, their significance is more difficult to evaluate due to the rising frequency characteristic which complicates the amplitude value at any given position. This disadvantage is eliminated by using the reference probe 11 and matched detector 12 to provide an output on line 13 which is fed back to the automatic levelling circuit of the sweep generator in such a manner as to maintain the detected output of the reference probe constant over the frequency range of the sweep oscillator. The reference probe is preferably made identical to the measurement probe 16 which is provided with a similar matched detector 17, so that if the measurement line were match-terminated, the output from the measurement probe would also be constant, resulting in a horizontal line, rather than the upwardly sloping line which would otherwise be obtained, so that the fluctuations due to a unit under test can readily and accurately be measured with respect to any horizontal reference line of the graph. The reference slotted line is provided with a reference termination 14, while the measurement line 8 is connected to the unit under test 18, and the resulting signal picked up by measurement probe 16 is supplied to amplifier 19 which provides the Y-axis input to recording device 21, while the X-axis input is supplied on line 22 from the sweep oscillator 2. If a graphic X-Y recorder is used, the resulting record is of the general type shown in FIG. 5. The desired VSWR value at any frequency is the square root of the ratio of the distance between the top point and the zero reference line and the distance between the bottom point and the zero reference line where the recorded envelope crosses the desired frequency line. The envelope as a whole is seen to fluctuate up and down; these vertical fluctuations are caused by: (a) imperfect division in the power divider, which may not divide power equally to the two channels, (b) the reference termination may have some residual reflection, so that the total voltage picked up by the reference probe varies as a function of frequency due to the reflection coefficient of the reference terminal (the fluctuations will lie close together if the electrical distance between the reference probe and the reference terminal is very large because the phase of the reflected signal then changes constantly; therefore, if two slotted lines are used, the reference probe is moved as close as possible to the reference terminal), (c) the difference in construction of the probe and in the response of the detectors can also cause fluctuations. With a well-designed power divider, a good reference termination, well-matched detectors and substantially identical probes, it is possible to obtain very nearly flat voltage output, in which case the band of swept signals will have very little vertical fluctuation and will be more nearly horizontal. However, in any case, these fluctuations do not cause any error whatsoever. The fluctuations only make the measurement somewhat less convenient.

It would be much more convenient to obtain the VSWR value directly from the distance between the top and bottom of the recording band rather than from the before-mentioned ratio. This can be achieved by using the logarithmic A-C to D-C converter 20 in FIG. 1. Since the output D-C voltage of the converter is proportional to the logarithm of the A-C input voltage, the ratio $e_{ac}$ max/$e_{ac}$ min at the input is converted to log ($e_{dc}$max/$b\$dc$ min), which is log $e_{dc}$max − log $e_{dc}$min. This difference is constant, independent of the actual level of the A-C input voltages, as long as the ratio stays constant. Since the gain of the A-C to D-C converter and of the stabilized VSWR amplifier 19 is not measured, this distance is calibrated in VSWR by using the VSWR scale on the stabilized VSWR indicator 19.

At higher frequencies it is quite difficult to obtain very symmetrical power dividers and a very good reference termination, simply because the reference line must be connected to the system at both ends, and both of these connections can cause reflections which can produce such fluctuations of the envelope as a whole. To avoid all of these problems, a somewhat different circuit arrangement is used, as shown in FIG. 2. In this figure, the same reference numerals are used for the corresponding elements shown in FIG. 1, since the elements are essentially the same except that power divider 4 is replaced by a 15 dB attenuator 26 having a flat frequency response and a low input and output VSWR. Furthermore, the output of the sweep generator is not supplied in this case to the power divider but directly to the reference slotted line 9. The reference line 9 and the measurement line 8 are in series with each other and are connected together through the attenuator 26, which has sufficiently high attenuation so that the reflections of the unit under test do not appear in the reference line. Except for this, the system behaves in the same way as the parallel system. Fluctuations in the output of the probe can be caused by the frequency sensitivity of the attenuator, which is usually less than the asymmetry of the power divider, but the connections between the reflected line and the attenuator can also cause fluctuations; to avoid even this problem, the tandem arrangement of FIG. 3 is used. In this case, the reference line is entirely abandoned and is replaced by a lossy line attenuator 31, which is typically a coaxial line section, except that the inner conductor has a resistive layer thereon acting as an attenuator. The reference probe 11a is put into the reference line as shown in FIG. 2 or as in a slotted line except that now, since the probe need not be moved, it can be inserted through a hole in the outer conductor in a convenient manner. The advantage of this scheme is that since no termination is necessary, there is no connection necessary and the RF signal which is incident to the input of the RF attenuator is simply constantly attenuated down and at some point of the attenuation the reference probe picks up the signal. Any reflection of the output connector is attenuated to a very low value before it can return to the probe. Also, any reflection from the unit under test is similarly attenuated before it reaches the probe. In this way, multiple reflections due to the output connector of the power divider or due to the termination or due to the connector between it and the reference line are avoided because there are no connections there; instead, there is a straight-through, well-made reference line in which the inner conductor simply acts as a resistive device and attenuates the RF signal. This 20 dB attenuator 31 with the reference prove 11a in the side thereof, however, is only suitable for high frequency use, typically above 8 GHz, where the probe becomes small. It can be used at lower frequencies only with more difficulty due to the increased size of the probes. For low frequencies it is preferable to use the parallel system because in this case the reflections of the connectors are not as severe, and use of the reference probe and reference slotted line is satisfactory, while for high frequencies where the physical dimensions are small, connectors are more of a problem, the tandem arrangement with the attenuator in the built-in probe may be preferable.

The probe used for the slotted line is essentially a transmission line with the actual probe point constituting a small antenna at the front end (i.e., small compared with the wavelength), and is in practice an exposed section of the inner conductor of the coaxial line to which the probe is connected. To avoid changes of the reflection coefficient of the probe, it is made equal to the impedance of the probe transmission line system, usually 50 ohms, i.e., the wire is selected of such diameter that within the grounded outer conductor of the slotted line it becomes a 50 ohm line. An execution of this idea for a so-called "slab line" is shown in FIG. 4. The outer conductor consists of two parallel metal plates 32 and 33, and between them the round inner conductor 34 is placed to complete the coaxial line section. Proper spacing of the two plates and proper selection of the diameter of the inner conductor are employed to make the entire assembly a 50 ohm coaxial transmission line, in order to match with the standard usually employed. The probe 36 is located between the two parallel plates and is slidably supported on a suitable slide element 37 so that it can be moved along the length of the assembly without changing its relative distance to the conductors of the line. If the probe wire is made as thick as the inner conductor, it can constitute an element of the 50 ohm transmission line. However, an inner conductor so large does not provide the desired resolution normally necessary for a probe pickup, so the probe end is shaped like a chisel as shown at 39, with the chisel edge at right angles to the movement of the probe, so that at the sharp tip of the probe, it acts as an infinitely short probe dimensionally in the direction of the movement of the probe and therefore a pickup voltage at a well-defined point is obtained. The broadband crystal mount 38 is conventional, and commercially available units can be used for this purpose and will provide satisfactory performance over a 5–1 to 10–1 frequency range.

The amplifier between the probe output and the recorder (or memory oscilloscope) input can be a conventional VSWR amplifier. These amplifiers are mostly linear. This means that for a given VSWR the distance between max. amplifier output and min. amplifier output is a function of the probe output level. In other words, if the VSWR is 1.20, and the max. amplifier output is 1.44 volts, the min. amplifier output will be 1.00 volts, the difference being 0.44 volts. If, at another frequency for instance, the probe output has doubled, the max. amplifier output is 2.88 volts and the min. amplifier output is 2.00 volts, the difference being 0.88 volts. It is therefore advantageous to use a linear to logarithmic converter between the amplifier output and the recorder input. The difference between the max. and the min. output of the converter is then equal to the ratio of the input voltages and therefore will be constant for a given VSWR irrespective of changes in the probe output.

I claim:

1. System for measuring the VSWR of a unit under test through a continuous range of frequencies covering at least an octave comprising:
   a. a measurement slotted line having a slidable untuned test probe and detector, and means for connecting the slotted line to a unit to be tested,
   b. sweep generator means for repeatedly supplying said slotted line with electrical energy over said range of frequencies, at a repetition rate such that substantially the entire said range of frequencies is swept through at closely spaced successive positions of the test probe as the probe is moved along the slotted line,
   c. a reference line also supplied by said sweep generator with electrical energy which is related in value to the energy supplied to the slotted line, said reference line being provided with a reference termination,
   d. a reference probe for sampling energy at a point on said reference line,
   e. level control means for maintaining a constant detected voltage level at the reference probe over the sweep frequency range,
   f. recording means supplied by said sweep generator means and by said test probe through said detector for recording the probe output as the frequency range is swept and as the test probe is moved along the slotted line.

2. The invention according to claim 1, including similar matched detectors mounted at the ends of the respective probes and coupled therewith for supplying the detected signal output to the sweep generator and to the recording means respectively.

3. The invention according to claim 1, said reference line being a second slotted line similar to said measurement slotted line, and a power divider connected to said sweep generator and to both of said slotted lines for supplying power from the sweep generator in a predetermined ratio to said slotted lines.

4. The invention according to claim 1, and a flat frequency response attenuator having a low input and output VSWR, said attenuator being inserted between and in series with said reference line and said measurement slotted line.

5. The invention according to claim 1, said reference line being a lossy line attenuator, said reference probe being electrically coupled to said attenuator.

6. System for measuring the VSWR of a unit under test through a continuous range of frequencies covering at least an octave comprising
   a. a measurement slotted line having a slidable test probe and means for connecting the slotted line to a unit to be tested,
   b. sweep generator means for supplying said slotted line with electrical energy over said range of frequencies,
   c. a reference line also supplied by said sweep generator with electrical energy which is related in value to the energy supplied to the slotted line, said reference line being provided with a reference termination,
   d. a reference probe for sampling energy at a point on said reference line,
   e. feedback circuit means from said reference line test probe to said sweep generator for maintaining a constant detected voltage level at the reference probe over the sweep frequency range,
   f. recording means supplied by said sweep generator and by said test probe for recording the probe output as the frequency range is swept and as the test probe is moved along the slotted line, said slotted line having two parallel spaced elongated conductive plates and a central conductor extending between and parallel with said plates, a probe extending between said plates, substantially at right angles to said conductor, said probe having a chisel edge in close proximity to said central conductor, said chisel edge being substantially perpendicular to the axial direction of the said central conductor.

7. The invention according to claim 6, and guide means supporting said probe for motion along said slotted line with its chisel edge in the same close proximity to said central conductor and in the same direction with respect thereto.

8. System for measuring the VSWR of a unit under test through a continuous range of frequencies covering at least an octave comprising:
   a. a measurement slotted line having a broadband untuned test probe and means for connecting the slotted line to a unit to be tested,
   b. sweep generator means for repeatedly supplying said slotted line with electrical energy over said range of frequencies, at a repetition rate such that substantially the entire said range of frequencies is swept through at closely spaced successive positions of the test probe as the probe is moved along,
   c. recording means supplied by the sweep generator and by the test probe for recording the probe output as the sweep generator is repeatedly swept through its said range of frequencies.

9. The invention according to claim 1, and a reference line also supplied by said sweep generator with electrical energy which is related in value to the energy supplied to the slotted line, and level control means including feedback circuit means from said reference line test probe to said sweep generator.

* * * * *